United States Patent [19]
Tuck et al.

[11] Patent Number: 5,620,240
[45] Date of Patent: Apr. 15, 1997

[54] ANTI-LOCK BRAKE METHOD AND SYSTEM INCLUDING A VARIABLE PRIMARY TO SECONDARY APPLY HOLD STAGE

[75] Inventors: Brian C. Tuck; Mark S. Luckevich, both of Ann Arbor; Bernard W. Johnson, Brighton, all of Mich.

[73] Assignee: Kelsey-Hayes Company, Romulus, Mich.

[21] Appl. No.: 303,700

[22] Filed: Sep. 9, 1994

[51] Int. Cl.$^6$ ................................................. B60T 8/32
[52] U.S. Cl. ................................... 303/156; 303/186
[58] Field of Search .......................... 303/91–111, 157, 303/158, 156, 159, 186; 364/426.02

[56] References Cited

U.S. PATENT DOCUMENTS

| | | | |
|---|---|---|---|
| 4,365,847 | 12/1982 | Martin | 303/93 |
| 4,576,419 | 3/1986 | Leiber | 303/100 |
| 4,746,173 | 5/1988 | Fennel et al. | 303/100 |
| 4,762,375 | 8/1988 | Maki et al. | 303/156 |
| 4,883,326 | 11/1989 | Sugitani et al. | 303/100 |
| 4,886,322 | 12/1989 | Atkins | 303/100 |
| 4,997,236 | 3/1991 | Naito et al. | 303/184 |

OTHER PUBLICATIONS

Bosch Technische Berichte (Feb 1982) pp. 65–93 vol. 7, No. 2 (1980).

Makoto Satoh and Shuji Shiraishi; "Performance Of Antilock Brakes With Simplified Control Technique"; Copyright 1983 Society Automotive Engineers, Inc., No. 830484.

*Primary Examiner*—Matthew C. Graham
*Attorney, Agent, or Firm*—MacMillan, Sobanski & Todd

[57] ABSTRACT

A method and system for controlling an anti-lock brake system cycle rate in a vehicle wherein the cycle includes a primary apply stage and a secondary apply stage in which increasing pressure is applied to the brake. The primary and secondary stages are separated by a hold stage in which a substantially constant pressure is applied to the brake for a time interval which varies as a function of the estimated average vehicle deceleration.

15 Claims, 3 Drawing Sheets

ANTI-LOCK BRAKE METHOD AND SYSTEM INCLUDING A VARIABLE PRIMARY TO SECONDARY APPLY HOLD STAGE

TECHNICAL FIELD

This invention relates to anti-lock brake systems, and more particularly, to the control of brake pressure application in anti-lock brake systems.

BACKGROUND ART

When the brakes are applied on a vehicle traveling on a driving surface at a given velocity, a braking torque is generated at each of the braked wheels. Each braking torque causes a retarding or braking force to be generated at an interface between a corresponding tire and the driving surface. The braking force generated at each of the wheels then causes a decrease in the velocity of the vehicle.

Ideally, the braking force at each of the braked wheels would increase proportionately as the driver increases the force on the brake pedal. Unfortunately, this is not the case in all braking procedures. As the braking torque and hence the braking force at a wheel is increased, the rotational speed of the wheel becomes less than the speed of the vehicle. When the rotational speed of a wheel is less than the vehicle speed, "slippage" is said to occur between the tire and the driving surface. This slippage, when severe, can lead to lock-up of a wheel and skidding of the vehicle. In most cases, lock-up causes an increase in the stopping distance. Lock-up also causes a degradation in directional control due to a reduction in lateral forces at the wheels.

Both of the above-mentioned problems associated with lock-up were addressed with the introduction of anti-lock brake systems (ABS). A basic anti-lock brake system uses wheel speed sensors to monitor the velocity at one or more of the wheels, decides whether any of the wheels is at or approaching an excessive wheel slip condition based on these velocity measurements, and modulates a braking pressure accordingly to avoid lock-up. The ABS aids in retaining vehicle stability and steerability while providing shorter stopping distances.

An implementation of a general anti-lock brake system comprises one or more wheel speed sensors for sensing the rate of angular rotation of one or more selected wheels, one or more modulator units each capable of adjusting a brake actuating force to a corresponding wheel in response to an input signal, and a control unit which interprets input signals from the wheel speed sensors and transmits controlling output signals to the modulators. In a hydraulic brake system, each modulator contains one or more control valves for adjusting an application of hydraulic fluid pressure to a wheel cylinder capable of converting hydraulic fluid pressure to a mechanical force for actuation of a corresponding brake. To enable this function, each modulator is interposed between a brake master cylinder and a corresponding wheel cylinder.

The standard anti-lock brake system is capable of detecting excessive slip or wheel departure and wheel recovery from the slip based on input data. One method for identifying an excessive wheel slip condition in the control unit is by comparing the measured velocity of each wheel to a reference speed. The reference speed is an estimate of the true vehicle speed based on current and previous values of the individual wheel velocities. If the velocity of a wheel is less than the reference speed by a predetermined amount, then the wheel is deemed by the control unit to be excessively slipping. The control unit then commands a corresponding modulator to reduce the hydraulic pressure actuating a corresponding brake in order to reduce brake torque. The reduction of brake torque causes a reduction of the braking force, which then causes a reduction of the slip in the wheel.

In practice, the ABS reduces the brake pressure by first commanding a control valve to isolate brake fluid in an individual wheel brake from an increasing brake fluid pressure in the master cylinder. This isolation holds the brake fluid pressure in the wheel brake constant. Next, the ABS commands another control valve to bleed, or dump, brake fluid from the wheel brake to thereby reduce brake fluid pressure therewithin. Thereafter, the ABS typically holds brake fluid pressure in the wheel brake constant for an amount of time computed within the control unit. After a period of constant braking pressure following the pressure reduction, the pressure actuating the brake is increased until excessive wheel slip occurs again. The increase in brake pressure is accomplished by a reapplication of brake fluid to the wheel brake. The resulting cycle of decreasing the brake pressure, maintaining constant brake pressure, and then increasing brake pressure is repeated until excessive slip no longer occurs. The specifics of this brake pressure cycle depend on an anti-lock brake system algorithm that is employed within the control unit, along with both the vehicle and the driving surface conditions encountered during braking.

SUMMARY OF THE INVENTION

With the foregoing in mind, it is an object of the present invention to provide an improved method and system for optimizing both the stability and stopping distance of the vehicle during ABS operation on a relatively low coefficient of friction surface.

It is another object of the present invention to provide an improved method and system for optimizing both the stability and stopping distance of the vehicle during ABS operation on a relatively low coefficient of friction surface by adjusting the time between wheel departures, or cycle time of the system, as a function of vehicle average deceleration.

It is another object of the present invention to provide a method and system for optimizing both the stability and stopping distance of the vehicle during ABS operation on a relatively low coefficient of friction surface introducing a variable time interval during the application of pressure to the brakes during ABS operation, which variable time interval is a function of vehicle average deceleration.

It is another object of the present invention to provide a method and system for optimizing both the stability and stopping distance of the vehicle during ABS operation on a relatively low coefficient of friction surface by adjusting the cycle time of the system by introducing a variable time interval between the primary and secondary applications of pressure to the brakes during ABS operation, which variable time interval is a function of vehicle average deceleration and wherein the cycle time adjustment for the rear brakes is relatively greater than the cycle time adjustment of the front brakes.

In accordance with the present invention a high level of vehicle stability is maintained while obtaining optimum stopping distance during low surface coefficient of friction conditions(low mu), by reducing the cycle rate of the front and rear wheels relative to the fixed cycle rate normally commanded under high surface coefficient of friction conditions(high mu). An indication of mu is determined from a calculation of estimated average vehicle deceleration(ADEC) based on wheel speed sensor input data. When a wheel recovers following the dump and hold modes of operation and starts to decelerate again, the apply mode is entered. In the present invention the apply mode comprises two distinct apply stages, namely a primary apply stage followed by a secondary apply stage. The two apply stages are separated by a hold stage i.e. a time interval during which pressure to the wheel is maintained substantially constant. Under high mu conditions, when ADEC is above a threshold value, respective predetermined fixed time intervals are effective for both the front and rear wheels. The fixed time interval is greater, and therefore the cycle rate is less, for the rear wheels than for the front wheels. As ADEC drops below the threshold the time interval between the primary and secondary apply stages increases proportionally greater for the rear wheels than for the front wheels further reducing the cycle rate for both front and rear wheels but more for the rear than the front wheels.

It is noted for this and the following discussions that the term "wheel" is used to describe one or more wheels that are affixed to one another. Thus, two wheels affixed to one another and attached to one end of an axle, such as is found on the rear axles of many large trucks, is considered as a single wheel.

BEST MODE OF CARRYING OUT THE INVENTION

Figure 1:
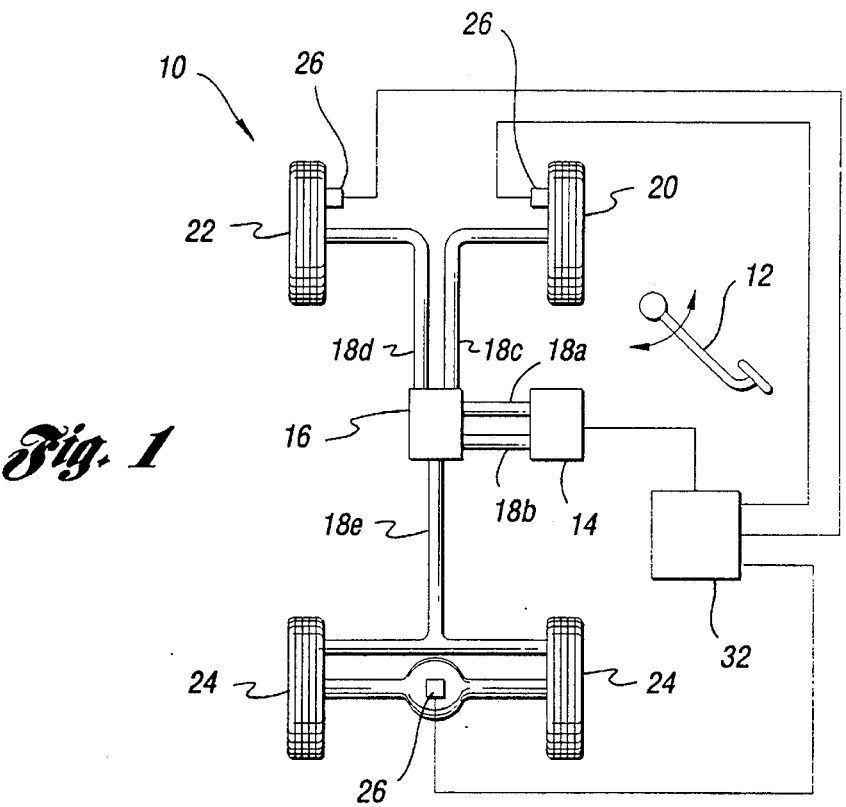
FIG. 1 is a schematic drawing of an anti-lock brake system.

Referring now to the drawings and initially to FIG. 1, there is shown a schematic diagram of an anti-lock brake system (ABS) for use with the present invention, designated generally by reference numeral 10. Although the system shown is generally referred to as a vertical split system, it should be understood that the present invention is equally applicable to other known system configurations, such as a diagonal system. The ABS 10 includes a brake pedal 12, a master brake cylinder 14, a control valve 16, and brake fluid conduits 18a, 18b, 18c, 18d and 18e. As shown, the ABS is utilized in conjunction with a vehicle having front wheels 20, 22 and a pair of rear wheels 24.

As illustrated, the control system 10 of the present invention includes three vehicle wheel speed sensors, shown generally by reference numeral 26, which function to measure the velocity of each of the front wheels 20, 22, and the rear wheels 24. It should be understood that the present invention is not limited to a particular number of sensors. The control system also includes an ABS electronic control unit (ECU) 32. Each of the wheel sensors 26, as well as other well-known sensors not specifically illustrated for the sake of clarity, are in electrical communication with the ECU 32. As is well-known in the art, each of the wheel speed sensors 26 may comprise a stationary variable reluctance sensor positioned adjacent a toothed wheel (not specifically illustrated) which rotates with its respective vehicle wheel 20, 22 and 24. The variable reluctance sensors each generate a pulsed signal whose frequency varies directly with the speed of the wheels. Each of these signals is communicated to the ECU 32 by the wheel sensors 26 for use in accordance with the present invention, as described in greater detail below. Of course, other well-known wheel speed sensor configurations may also be employed. As is well known in the art, the control valve 16 may include apply and dump valves (not specifically illustrated) selectively operable by the ECU 32 for the controlling pressure in the conduits 18c, 18d and 18e as previously discussed.

The ECU 32, in turn, is itself in electrical communication with the ABS control valve generally shown at 16. Although interconnections have been described as being electrical, it should be appreciated that other forms of connection, such as fiber optics, are possible. For purposes of this discussion, the ECU 32 includes electronic components and executes software, permitting the ECU 32 to control the ABS according to the present invention. In the preferred embodiment, the ECU 32 includes a commercially available microprocessor. In general, the ECU 32 operates to activate the apply or dump valves, to control pressure or to hold pressure at its current level.

To activate the anti-lock brake system, the ECU 32 is operatively connected to the ABS control valve 16, which provides for regulation of the brake fluid pressure from the master brake cylinder 14 to the individual brakes (not specifically illustrated) of each of the wheels 20, 22, 24 via the brake fluid conduits 18a, 18b, 18c, 18d, and 18e.

The control system 10 has been described and shown herein for use with an ordinary passenger vehicle ABS. However, it should be readily appreciated that the control method and system 10 are suitable for use in any vehicles wherein an ABS may be required. Generally, an ABS controller must continually force wheel departures, that is to say a predetermined slippage, in order to ensure that peak pressure has been attained. After a departure has been established, and brought back to recovery, the pressure must be returned quickly to the peak pressure for good performance. This describes the fundamental behavior of a good ABS controller.

Figure 2A:
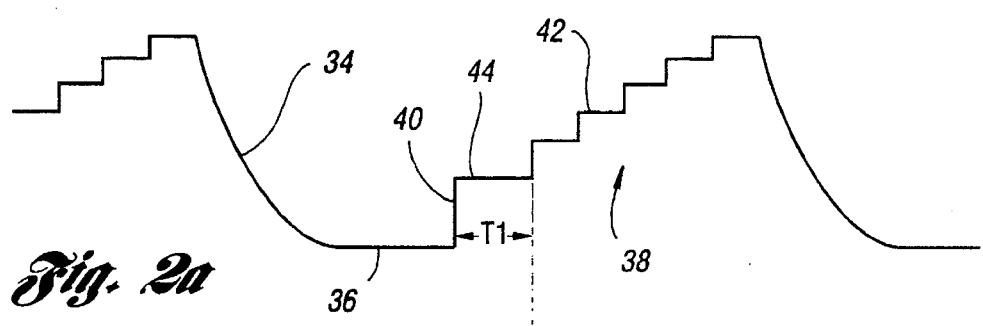
FIGS. 2a and 2b are typical graphs of a wheel brake pressure cycle of a vehicle being braked on a relatively high mu and a relatively low mu surface respectively.

FIG. 2a illustrates an example of a brake pressure cycle that occurs during an anti-lock brake system event on a relatively high mu road surface. An anti-lock brake system cycle comprises: a dump stage 34 wherein the brake pressure is decreasing with time, a hold stage 36 wherein the brake pressure is nearly constant with time, and an apply stage generally designated 38 wherein the brake pressure is increasing with time. The apply stage shown in FIG. 2a comprises a primary apply stage 40 and a secondary apply stage 42 each having a positive average rate of increase in pressure applied to the brake. As shown in FIG. 2a, the primary apply stage 40 has a higher average rate of pressure increase than the secondary apply stage 42. The purpose of the primary stage is to return pressure as quickly as possible after the wheel has recovered from a departure without overshooting the maximum pressure the wheel can take. Various criteria for initiating the primary stage may be followed. For example, the primary apply stage may begin at some variable time after wheel recovery in the current cycle, after wheel recovery but before the wheel stops accelerating, coincidentally when the wheel stops accelerating or after the wheel stops accelerating. In any event, it is desirable to return pressure as quickly as possible to optimize the area under the pressure curve (the area is the amount of work the wheel is doing to stop the vehicle). The purpose of the secondary stage is to gently force the next departure in the desired amount of time.

Between the primary and the secondary apply stages a hold interval 44 of substantially constant pressure, defining the duration of the primary apply stage, is in effect. The hold interval is a time interval which, in accordance with the present invention includes both a fixed and a variable time segment the latter of which is dependent on an estimate of average vehicle deceleration ADEC. The calculation of ADEC by the ECU 32 is performed by differentiating an estimate of the average vehicle speed (AVEL) and then filtering the result. The average vehicle speed is estimated from the data from the front and rear wheel speed sensors.

Figure 2B:
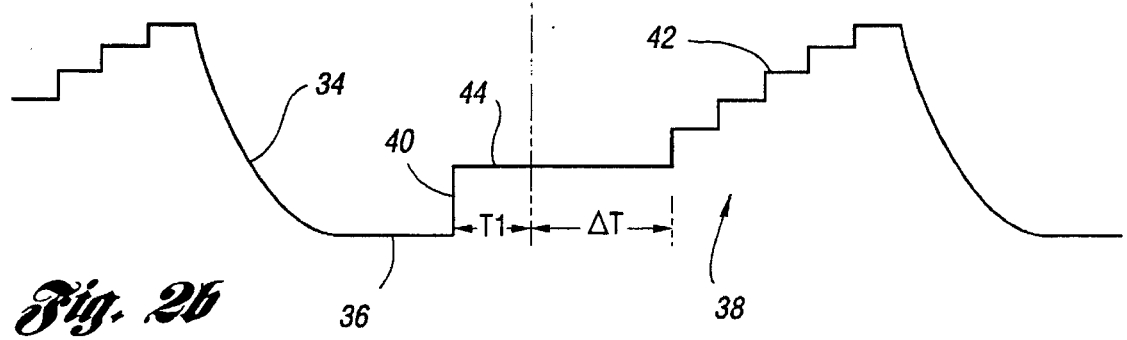
Figure 3:
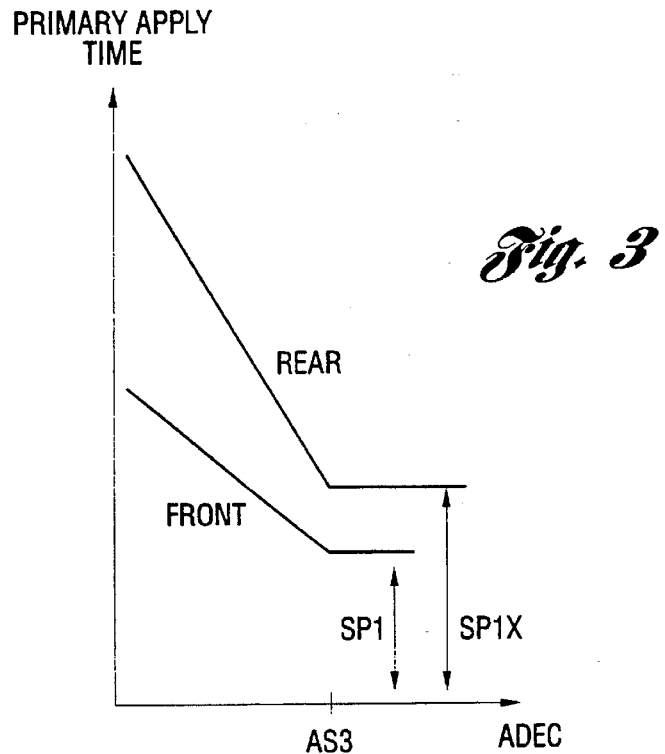
FIG. 3 is a chart of the variable hold time interval between the primary and secondary apply stages as a function of estimated average vehicle deceleration.

The primary stage 40 is effective during a fixed time segment designated T1 in FIG. 2a, whenever ADEC is above a predetermined threshold AS3, depicted in FIG. 3. The time segment T1 associated with the braking of a front wheel is SP1 while the time segment T1 associated with braking a rear wheel is of longer duration SP1X. As shown in FIG. 2b, the duration of the primary stage is increased by ΔT as a function of ADEC for front and rear wheels is depicted in the chart in FIG. 3. The time interval SP1 and SP1X would be in effect, for example, if the vehicle was being braked on a relatively high mu road surface as depicted in FIG. 2a while the time interval SP1+$\Delta T_f$ (front wheels) and SP1X+$\Delta T_r$ (rear wheels) would be in effect if the vehicle was being braked on a relatively low mu road surface as depicted in FIG. 2b. Thus, the primary stage duration is extending as ADEC decreases below the breakpoint or threshold AS3 in accordance with the chart shown in FIG. 3. Below AS3 the vehicle is considered to be braking on a relatively low coefficient of friction surface. As indicated in FIG. 3, the cycle rate decreases, i.e. the period of time between wheel departures increases, as ADEC decreases, indicative of a low mu road surface, for both the front and rear wheels. However a greater cycle rate decrease is applied to the rear wheels to optimize stability.

Figure 4A:
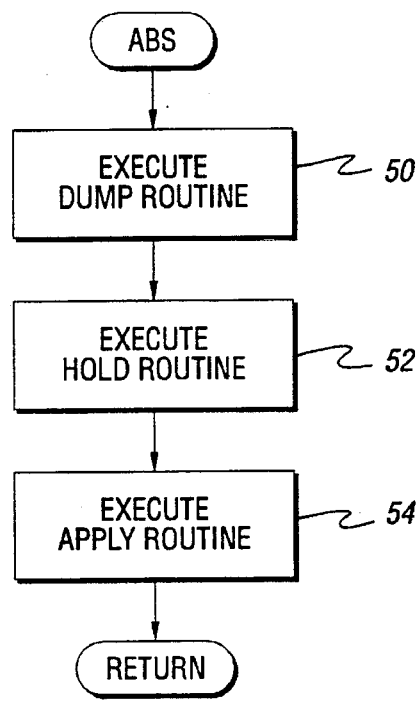
FIGS. 4a, b and 4c are flowcharts of a method of controlling the ABS brake pressure control cycle by varying a hold stage intermediate primary and a secondary apply stages of the brake pressure cycle.
Figure 4B:
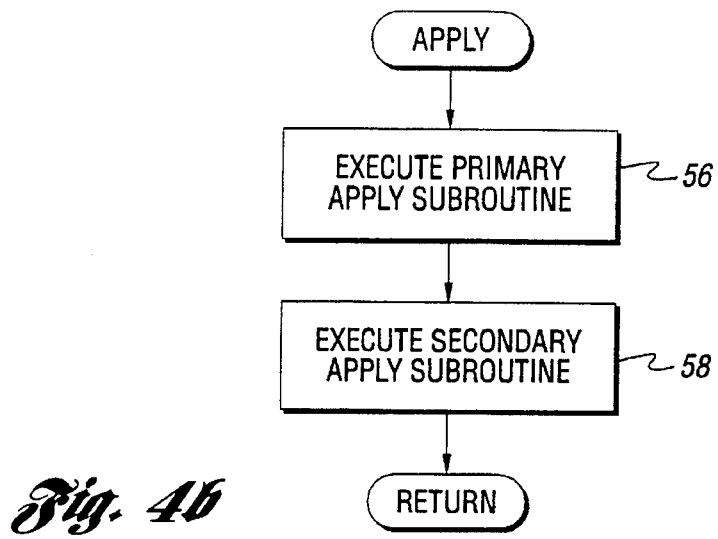
Figure 4C:
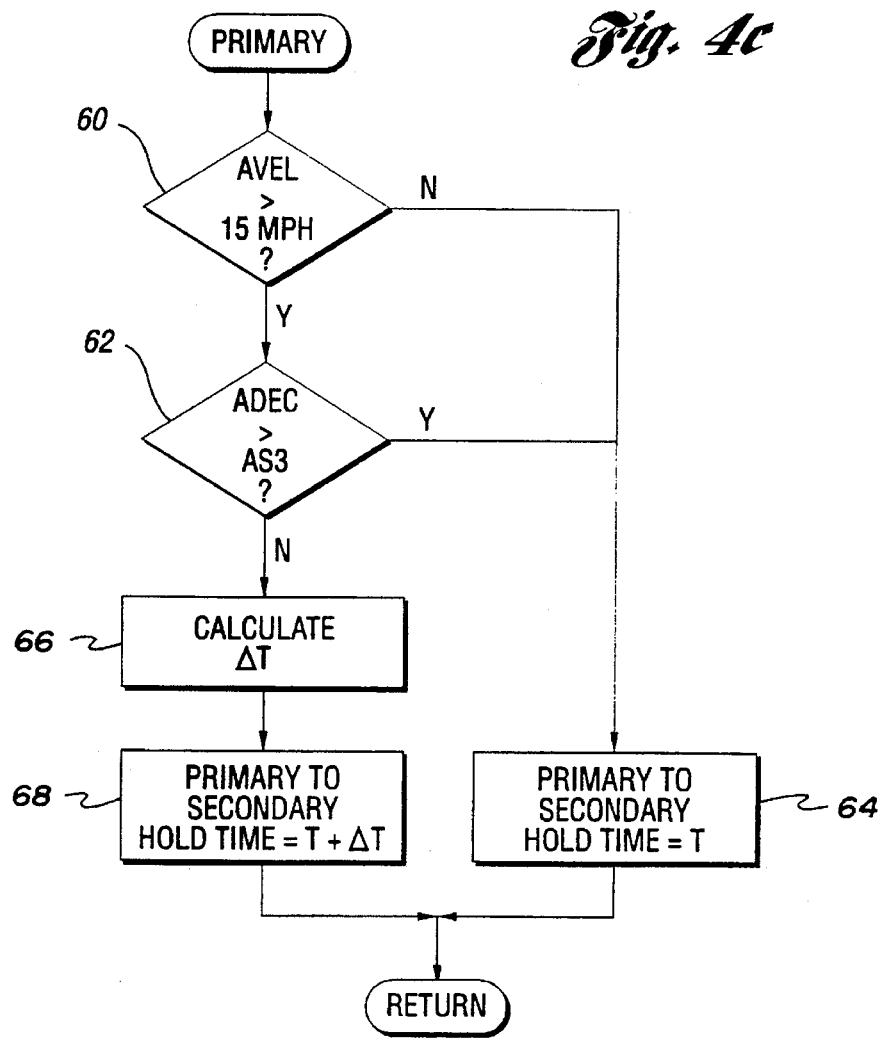

Referring now to FIGS. 4a–4c, flowcharts depicting the ABS cycle and the method of controlling the application of pressure to the a wheel brake is shown. The overall flow chart of the ABS cycle is shown in FIG. 4a and includes the execution of a Dump routine 50 followed by a Hold routine 52 and finally an Apply routine 54. As shown in FIG. 4b the Apply routine includes a primary apply subroutine 56 and a secondary apply subroutine 58.

The present invention is primarily concerned with the duration of the primary apply stage which is determined during the subroutine 56 shown in greater detail in FIG. 4c. With reference to FIG. 4c, if the average vehicle velocity AVEL is less than a predetermined velocity, for example, 15 miles per hour as determined in the decision block 60 or the average vehicle deceleration ADEC is greater than the predetermined threshold AS3 as determine by the decision block 62, then the primary apply time is the fixed time segment T1 (SP1 for front wheels, SP1X for rear wheels), as indicated in the block 64 and previously discussed with respect to FIG. 3. After the time interval T1 expires the secondary apply routine 58 is entered. On the other hand if AVEL is greater than 15 miles per hour and ADEC is less than AS3 as determined by the decision blocks 60 and 62, then the variable time segment ΔT ($\Delta T_f$ for front wheels and $\Delta T_r$ for rear wheels) is calculated at block 66 as a function of ADEC. The primary apply time in this case is the sum of T1 and ΔT as indicated in block 68. The software implementation of the calculation of the duration of the primary apply stage may be accomplished in various ways apparent to those skilled in the art. The equation used to determine the duration for the front wheels may be expressed as:

Duration=(AS3−ADEC)/$2^{AS8}$ for ADEC<AS3 where AS8 is a trimmable constant establishing the slope of the ADEC vs. time chart of FIG. 3 below the breakpoint AS3.

Duration=SP1 for ADEC>AS3 Similarly the duration of the primary apply stage for the rear wheels may be expressed as:

Duration=(AS3−ADEC)/$2^{AS7}$ for ADEC<AS3 where AS7 is a trimmable constant for the rear wheels.

Duration=SP1X for ADEC>AS3 Preferably, the calculated hold duration specifies the number of microprocessor loops added between the primary and secondary apply stages. The duration is rounded to an integer value which represents the number of 5 msec. loops added to the time T1.

It will be apparent to those of ordinary skill in the art that the method and system of the present invention could be applied to vehicles having any number of wheels, and any subset thereof being capable of pressure-responsive braking.

While the best mode for carrying out the invention has been described in detail, those familiar with the art to which this invention relates will recognize various alternative designs and embodiments for practicing the invention as defined by the following claims.

What is claimed is:

1. A method of controlling a pressure-responsive brake for front and rear wheels of a vehicle, the vehicle having at least front and rear sensors capable of generating a signal representative of speed of said front and rear wheels respectively, the vehicle further having an anti-lock brake system capable of cyclic control of brake pressure wherein an anti-lock brake system cycle includes a primary and a secondary apply stage of increasing pressure applied to the brake separated by a time interval of substantially constant brake application pressure applied to each of said front and rear wheels, said time interval including a fixed portion and a variable portion, the method comprising a sequence of the following steps of:

activating the primary apply stage within the anti-lock brake system cycle, estimating vehicle speed based on said signal from said sensor, calculating an estimated vehicle deceleration based on said vehicle speed, setting said time interval at a predetermined duration as long as said estimated vehicle deceleration is above a predetermined threshold value, computing said time interval as a function of said estimated vehicle deceleration whenever said vehicle speed is greater than said predetermined speed and said estimated vehicle deceleration is below a predetermined threshold value, maintaining said substantially constant brake application pressure for said computed time interval proportional to said estimated vehicle deceleration and, activating the secondary apply stage upon completion of said time interval.

2. A method of controlling a pressure-responsive brake for a wheel of a vehicle, the vehicle having a sensor capable of generating a signal representative of speed of the wheel, the vehicle further having an anti-lock brake system capable of cyclic control of brake pressure wherein an anti-lock brake system cycle includes a primary and a secondary apply stage of increasing pressure applied to the brake separated by a time interval of substantially constant brake application pressure, the method comprising a sequence of the following steps of:

activating the primary apply stage within the anti-lock brake system cycle, estimating vehicle deceleration based on said signal from said sensor, computing said time interval as a function of said estimated vehicle deceleration whenever said estimated vehicle deceleration is below a predetermined threshold value, activating the secondary apply stage upon completion of said time interval, wherein said time interval includes a fixed portion and a variable portion.

3. The method of claim 2 wherein the vehicle includes a front and a rear wheel and said fixed portion is greater for said rear wheel than for said front wheel.

4. The method of claim 2 wherein said variable portion is proportionally increased as the estimated deceleration falls below said predetermined value.

5. The method of claim 4 wherein the vehicle includes a front and a rear wheel and the rate of increase of said variable portion is greater for said rear wheel than for said front wheel.

6. A method of controlling a pressure-responsive brake for a wheel of a vehicle, the vehicle having a sensor capable of generating a signal representative of speed of the wheel, the vehicle further having an anti-lock brake system capable of cyclic control of brake pressure wherein an anti-lock brake system cycle includes a primary and a secondary apply stage of increasing pressure applied to the brake separated by a time interval of substantially constant brake application pressure, the method comprising a sequence of the following steps of:

activating the primary apply stage within the anti-lock brake system cycle, estimating vehicle deceleration based on said signal from said sensor, computing said time interval as a function of said estimated vehicle deceleration whenever said estimated vehicle deceleration is below a predetermined threshold value, activating the secondary apply stage upon completion of said time interval, wherein the vehicle includes a front and a rear wheel and the estimated deceleration is based on a filtered differentiation of an estimate of vehicle velocity based on the sensed velocity of said wheels.

7. A system for controlling a pressure responsive brake for a wheel of a vehicle, the system comprising:

a speed sensor, responsive to the wheel, for generating a signal representative of a speed of the wheel;

a control unit responsive to the signal from said speed sensor for controlling brake pressure in an anti-lock brake system cycle including a primary and a secondary apply stage of increasing brake pressure separated by a time interval, said control unit responsive to said signal from said speed sensor for calculating an estimate of vehicle deceleration and for setting said time interval at a predetermined duration as long as said deceleration is above a threshold value and for extending said time interval beyond said predetermined duration as a function of said deceleration whenever said deceleration falls below said threshold value.

8. The system of claim 7 wherein the time interval extension increases linearly as the vehicle deceleration decreases below a predetermined value.

9. The system of claim 7 wherein said time interval is fixed for all values of vehicle decelerations greater than a predetermine value.

10. The system of claim 7 wherein the vehicle includes a front and a rear wheel and said predetermined duration is greater for said rear wheel than for said front wheel.

11. The system of claim 7 wherein the time interval extension increases proportionally as the vehicle deceleration decreases below a predetermined value.

12. The system of claim 11 wherein the vehicle includes a front and a rear wheel and the rate of increase of said time interval extension is greater for said rear wheel than for said front wheel.

13. The system of claim 7 wherein the vehicle includes a front and a rear wheel and the estimated deceleration is based on a filtered differentiation of an estimate of vehicle velocity based on the sensed velocity of said wheels.

14. Anti-lock brake system to optimize vehicle stopping distance while maintaining vehicle stability, where the pressure cycle for each of at least a front and a rear wheel includes a dump stage, a hold stage, and an apply stage, said apply stage including a primary and a secondary apply stage separated by delay period, comprising a sequence of the following steps:

initiating said primary apply stage, estimating the deceleration of the vehicle based on the velocity of said wheels, establishing a delay period of predetermined duration for all values of deceleration above a predetermined deceleration, increasing said delay period for at least said rear wheel when the deceleration estimate falls below said predetermined deceleration, to thereby decrease the cycle rate of the rear wheel relative to the front wheel.

15. The method of claim 14 wherein the delay period is increased for both the front and the rear wheel and the increase is proportionally greater for the rear wheel than the front wheel whereby the cycle rate for both wheels is reduced when said deceleration estimate falls below said predetermined deceleration but the cycle rate is reduced more for the rear than the front wheel.

\* \* \* \* \*